US005693743A

United States Patent [19]

Nastke et al.

[11] Patent Number: 5,693,743
[45] Date of Patent: Dec. 2, 1997

[54] AMINOPLASTICS

[75] Inventors: Rudolf Nastke, Rehbrücke; Gerald Rafler, Potsdam, both of Germany

[73] Assignee: Fraunhofer Gesellschaft zur Forderung der Angewandten Forschung e.V., Munich, Germany

[21] Appl. No.: 541,408

[22] Filed: Oct. 10, 1995

[30] Foreign Application Priority Data

Oct. 10, 1994 [DE] Germany ............... 44 36 182.3

[51] Int. Cl.[6] .................... C08G 12/12; C08G 12/32
[52] U.S. Cl. ............... 528/245; 528/120; 528/230; 528/243; 528/254; 528/423; 528/493; 528/503
[58] Field of Search ................... 528/120, 230, 528/243, 245, 254, 423, 493, 503

[56] References Cited

FOREIGN PATENT DOCUMENTS 2637424  2/1978  Germany .
9218601 10/1992  WIPO .

OTHER PUBLICATIONS

Chemical Abstract 57, col. 8761d, 1962.

Computer Abstract of JP 67–015635.

*Primary Examiner*—James J. Seidleck
*Assistant Examiner*—Duc Truong
*Attorney, Agent, or Firm*—Greenblum & Bernstein, P.L.C.

[57] ABSTRACT

The invention relates to aminoplastics, which are created by reacting compounds that contain amide groups with glutaric dialdehyde, and to a process for their preparation and to their use. The aminoplastic according to the invention is free of formaldehyde and can be hardened without difficulty by acidic catalysis or thermal processes. The aminoplastic is prepared by polycondensation of compounds that contain amide groups with glutaric dialdehyde in aqueous solution.

20 Claims, No Drawings

AMINOPLASTICS

CROSS REFERENCE TO RELATED APPLICATIONS

This application claims the priority of German Application No. P 44 36 182.3, filed Oct. 10, 1994, the disclosure of which is incorporated herein by reference in its entirety.

BACKGROUND OF THE INVENTION

The invention relates to aminoplastics, which are created by the reaction of compounds which contain amide groups with glutaric dialdehyde, a process for their preparation, and their use.

BACKGROUND OF THE INVENTION

Aminoplastics, which are also known as amino- or amidoresins, are understood very generally to be polycondensation products of carbonyl compounds, in particular compounds which contain formaldehyde and NH groups. As a rule, aminoplastics of this kind are produced with relatively low degrees of polymerization. These aminoplastics are then hardened upon use, for instance to make thermosetting plastics.

Depending on their conditions of preparation, however, the aminoplastics that have thus far been obtainable on the market contain more or less high proportions of free formaldehyde, and/or of hydroxymethyl groups, which release formaldehyde in the preparation process. The result is major pollution of processor facilities and of the environment. A further disadvantage of these known aminoplastics is that for the most part, the end products derived from these aminoplastics are also still capable of giving off formaldehyde. Because of the methylene group linkage of the amide groups, the end products are also quite brittle.

OBJECT AND SUMMARY OF THE INVENTION

With this as the point of departure, the object of the present invention is to disclose an aminoplastic that is free of formaldehyde and that can be hardened without difficulty by acidic catalysis or thermal processes.

The applicant has been able to demonstrate unexpectedly that if glutaraldehyde, as a carbonyl component in aqueous solution, is reacted with compounds that contain amide groups, the result is a formaldehyde-free aminoplastic. It is especially advantageous that the obtained aqueous solutions of these aminoplastics exhibit excellent storage stability. The aminoplastics described according to the invention are thus highly suitable for further processing by suitable methods (catalytically or thermally). With the aminoplastics of the invention, reactable solid resins can be prepared, for instance by spray methods. The aminoplastics of the invention can be used for all methods that use reactive resins (lamination, compacting compositions, laminated substances, paints, particulate structures, and the like). Because of the special type of linkage of the amide compound, the end products have high flexibility. The products obtained moreover all have very good transparency.

As compounds that contain amide groups, it is fundamentally possible to use all the compounds known from the prior art. Examples of this are urea, melamine, dicyandiamide, benzoguanamine, guanidine, benzamide, and acrylamide. It is especially preferably if urea, melamine or acrylamide is used as the compound that contains amide groups. Naturally, it is also possible to prepare the aminoplastic with mixtures of the aforementioned compounds that contain amide groups. What is essential to the invention is that the aforementioned compounds which contain amide groups be reacted in aqueous solution with glutaric dialdehyde. Depending on the degree of polymerization, liquid or solid aminoplastics are then obtained. In the case of the aminoplastic solutions, they generally have a slight yellow coloration and a storage stability that is comparable to that of commercially available aminoresin solutions. The resin solutions and solid resins can then be used similarly to how they are used in conventional aminoresin applications. For instance, the aminoplastics of the invention can be processed by acidic catalysis to make cross-linked plastic products, or they can be hardened by heat.

The preparation of the reactable formaldehyde-free aminoplastics can surprisingly be done successfully by means of a basically or acidically catalyzed condensation reaction of the glutaraldehyde with the compounds that contain amide groups. According to the invention, it is essential that the reaction be carried out in a 10 to 90% aqueous solution, preferably a 50% solution. For the preparation process, the reaction partners are mixed while being stirred at temperature of 20° to 90° C. and are made to react by a suitable adjustment of the pH value (3 to 10). Compared with known aminoresins, the degree of condensation and the attendant reactivity and processing properties are controlled in a similar way, via the molar ratio of the reaction partners, the temperature, the pH value and the reaction time. Preferably, 1 mol of compounds that contain amide groups and 0.5 to 3 mols of glutaraldehyde are used. It has proved to be especially favorable if the reaction is done with 1 mol of compounds that contain amide groups and 0.9 to 2.2 mols of glutaraldehyde. Preferred reaction conditions in terms of the temperature are 25° to 60° C. and in terms of the pH value 6 to 9. As already noted above, the reaction time depends on the desired properties of the aminoplastic. Preferred reaction times are 0.5 to 3 hours. As already known from the prior art, so-called modifiers can be used in the aminoplastics of the invention as well. Such modifiers are described, for example, in German Patent Disclosure DE 26 37 424, which is hereby entirely incorporated by reference. The aminoplastics that can be prepared by this method can be made into end products that have only slight brittleness. The films and coatings made from this also exhibit high transparency, flexibility, and excellent scratch resistance and hardness. A particular advantage of the aminoplastics described according to the invention and of the products made from them is that in contrast to the usual formaldehyde-based products, these products do not exhibit any significant partial splitoff of the aldehyde component during the production and hardening process. This minimizes pollution of the user's facilities and of the environment.

DESCRIPTION OF PREFERRED EMBODIMENTS

The invention will be described in further detail below in terms of exemplary embodiments.

Example 1

For the preparation of a reaction resin of glutaraldehyde and urea, 201 g of 50 weight % aqueous glutaraldehyde solution is placed in a suitable agitator reactor; the pH is adjusted to 7.8 with 1N aqueous sodium hydroxide, and the solution is heated to 40° C.; 60 g of urea is added to the solution, and the reaction mixture is left at this temperature for 100 minutes while stirring gently. The resultant, slightly yellowish resin solution has a syrupy consistency. The product can be taken for further processing as usual.

Example 2

In the aforementioned stirring reactor, 402 g of 50 weight % aqueous glutaraldehyde solution is adjusted to a pH value of 6.5 with 1N aqueous sodium hydroxide; 60 g of urea are added; and the reaction mixture is heated over the course of 60 minutes to 70° C. After that, the syruplike reaction product is cooled to room temperature. Next, 180 ml of water is added, and the pH is adjusted to 8.5 with triethanolamine. The product has good storage stability, and it is still amendable to further processing for relatively long periods of time.

Example 3

The procedure is as in Examples 1 and 2. 302 g of 50 weight % aqueous glutaraldehyde solution and 124 g of melamine are made to react.

Example 4

The procedure is as in Examples 1 and 2. 605 g of 50 weight % aqueous glutaraldehyde solution and 124 g of melamine are made to react.

Example 5

The procedure is as in Examples 1 and 2. 1010 g of 50 weight % aqueous glutaraldehyde solution, 60 g of urea and 124 g of melamine are made to react.

Example 6

Resin solutions are prepared as described in Examples 1–5. The resin solutions are converted in a spray dryer by dewatering into a finely divided solid reaction resin. The solid resin can be mixed with a number of typical additive substances (such as fillers) before and/or after dewatering. Further processing is done by the usual methods.

We claim:

1. A process for producing a prepolymer from an amide group-containing compound and glutaraldehyde, comprising:

reacting 1 mole of at least one of urea, melamine, and acrylamide with 0.5 to 3 moles of glutaraldehyde in a 10 to 90 weight % aqueous solution at a temperature of 20° to 90° C. for a duration of 5 minutes to 3 hours at a pH of 3 to 10.

2. The process of claim 1, wherein 1 mole of at least one of urea, melamine, and acrylamide is reacted with 0.9 to 2.2 moles of glutaraldehyde.

3. The process of claim 1, wherein the reaction is carried out at a pH of 6 to 9.

4. The process of claim 1, wherein the reaction is carried out at a pH of 6 to 9.

5. The process of claim 1, wherein the reaction is carried out at a temperature of 25° to 60° C.

6. The process of claim 2, wherein the reaction is carried out at a temperature of 25° to 60° C.

7. The process of claim 3, wherein the reaction is carried out at a temperature of 25° to 60° C.

8. The process of claim 1, wherein the glutaraldehyde is used in the form of a 10 to 50 weight % aqueous solution.

9. The process of claim 2, wherein the glutaraldehyde is used in the form of a 10 to 50 weight % aqueous solution.

10. The process of claim 3, wherein the glutaraldehyde is used in the form of a 10 to 50 weight % aqueous solution.

11. The process of claim 5, wherein the glutaraldehyde is used in the form of a 10 to 50 weight % aqueous solution.

12. The process of claim 1, wherein a modifier is added.

13. The process of claim 1, further comprising processing the prepolymer into a cross-linked amino resin through acid catalysis.

14. The process of claim 2, further comprising processing the prepolymer into a cross-linked amino resin through acid catalysis.

15. The process of claim 3, further comprising processing the prepolymer into a cross-linked amino resin through acid catalysis.

16. The process of claim 5, further comprising processing the prepolymer into a cross-linked amino resin through acid catalysis.

17. The process of claim 8, further comprising processing the prepolymer into a cross-linked amino resin through acid catalysis.

18. The process of claim 1, further comprising forming an amino resin through thermosetting.

19. The process of claim 2, further comprising forming an amino resin through thermosetting.

20. The process of claim 3, further comprising forming an amino resin through thermosetting.

* * * * *